July 8, 1947.  J. N. WOLFRAM  2,423,745

FLEXIBLE COUPLING

Filed Nov. 22, 1944

Inventor

John N. Wolfram

By Mason, Porter & Diller
Attorney

Patented July 8, 1947

2,423,745

UNITED STATES PATENT OFFICE 2,423,745

FLEXIBLE COUPLING

John N. Wolfram, Cleveland, Ohio, assignor to The Parker Appliance Company, Cleveland, Ohio, a corporation of Ohio Application November 22, 1944, Serial No. 564,578

1 Claim. (Cl. 285—90)

The present invention relates to tube couplings, and more particularly to improvements in couplings for flexibly clamping the end of a metal tube.

An important object of the invention resides in the provision of a flexible coupling for tubes or the like including threadedly engaged body and nut members defining therebetween an annular chamber for an annulus of rubber or like material, and a metal sleeve surrounding the rubber annulus for limiting the amount of deformation of the same when the nut and body are in coupled relation.

Another object of the invention is to provide a coupling of the above character wherein the rubber annulus is formed so as to minimize pinching and extrusion as the nut is moved relative to the body member.

A further object of the invention is to provide a coupling of the above character wherein accidental detachment of the tube is resisted through engagement of the nut and sleeve.

The above and other objects of the invention will in part be obvious and will be hereinafter more fully pointed out.

In the accompanying drawings.

Figure 1:
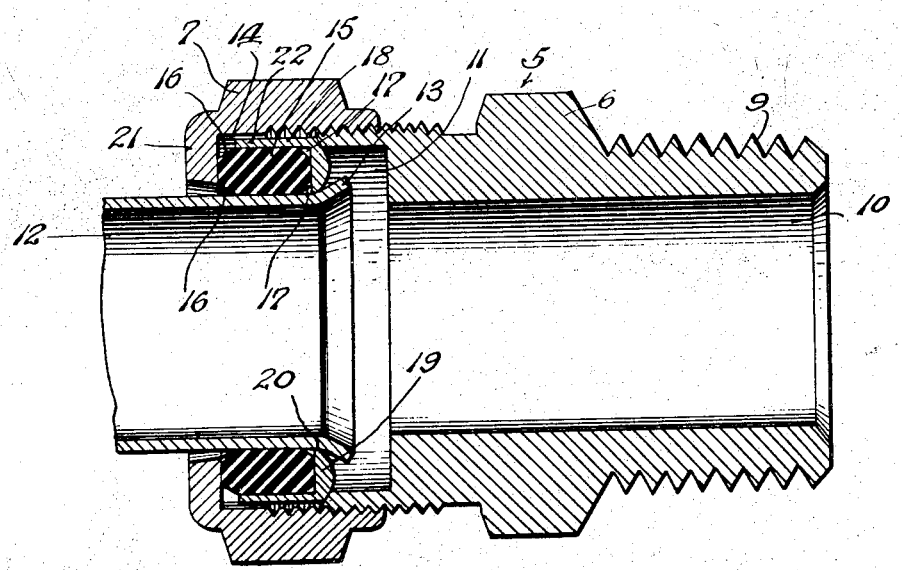
Figure 1 is a longitudinal view in section, showing the coupling with the tube inserted therein before the coupling members have been tightened relative to one another.

Referring to the drawing for a more detailed description thereof, the new and improved flexible coupling is generally designated by the reference numeral 5 and includes a body member 6, and nut 7, which threadedly engage one another, as at 8. The other end of the body member is provided with an exteriorly threaded portion 9 for attachment to a member, not shown, with which the tube is to be coupled. The body member 6 is provided with a central bore 10 and counterbore 11 communicating therewith. The diameter of the central bore 10 is substantially equal to the diameter of the tube 12 being coupled by the body member and nut. While the tube 12 is shown formed with an outwardly flared portion 13, it is to be understood that this end of the tube can be formed with a bead or any other type of enlargement within the meaning of the present invention. It is evident, however, that the enlarged end of the tube 12 is received within the counterbore 11 and is normally spaced from the walls thereof.

Figure 2:
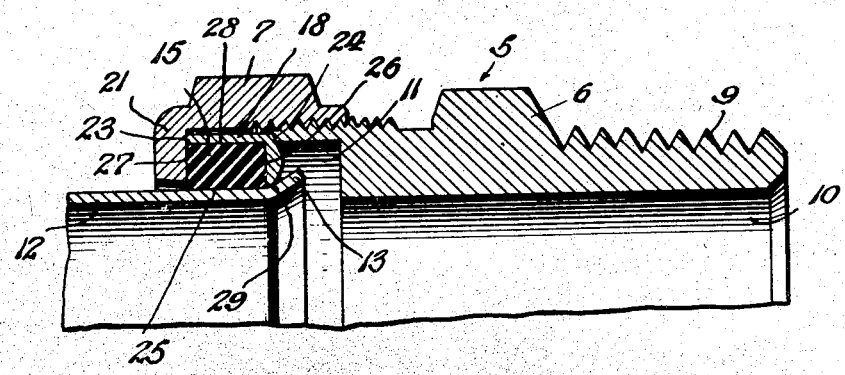
Figure 2 is a similar view in section illustrating the flexible coupling after the coupling members have been tightened relative to one another.

The nut 7 and body member 6, when in threaded engagement, including the counterbored area of the latter, define an annular chamber 14 in which is disposed a packing member 15 in the form of an annulus of rubber or like material, said packing member surrounding the tube 12 in the region of the enlarged or flared end 13 thereof. This packing member 15 can be of the shape shown, or if desired, it can be of elliptical or circular cross section. In the form illustrated, the edges are tapered as indicated at 16 and 17, defining spaces in which the material is extruded when the nut is tightened on the body member as shown in Figure 2.

The coupling further includes a metal sleeve 18 which surrounds the packing member 15, and which is formed with an inwardly turned flange 19 providing a side wall for one end of said packing member. When the coupling members are in their initially assembled relation shown in Figure 1, the flange 19 abuts the end of the body member 6, and at the same time contacts the tube 12 in the region of the flared end 13. There is, however, a slight clearance between the flange 19 and tube 12 in order to minimize extrusion of the rubber packing into the coupling at the area designated 20 and to also provide for full floating of the tube in rubber to effectively resist vibration and/or flexing of the tube.

The position of the tube 12 and the coupling members before the coupling members are tightened relative to one another is shown in Figure 1. When the nut 7 is turned on the threads 8 relative to the body member 6, the packing member 18 will be deformed so as to entirely fill that portion of the annular chamber defined by the flange 19 and inturned end 21 of the nut 7. As soon as the inturned end 21 makes contact with the end 22 of the sleeve 18, it will be a signal indicating that the coupling has been properly tightened. Also, the extent of deformation of the packing material 18 will be limited by the metal to metal engagement of the nut and sleeve at 23. When the coupling members are finally tightened, the parts will assume the positions shown in Figure 2.

The coupling, as thus formed, prevents leakage by the metal to metal seal between the sleeve and body at 24 and a rubber seal between the sleeve and tube at 25, and also at any one of the surfaces 26, 27 or 28. Under severe pull out strains, the enlarged end of the tube, whether it be flared or beaded, will engage the smoothly rounded edge 29 of the sleeve flange 19, thereby preventing cutting in and wearing or abrasion, which would tend to weaken the coupled parts. Displacement of the tube from the coupling is positively resisted through engagement of the nut and sleeve at 23.

It is to be clearly understood that various changes in the details and construction and arrangement of parts may be made without departing from the scope of the invention as set forth in the appended claim.

I claim:

A flexible coupling for a tube having an enlarged end, comprising coupling members having threaded engagement with each other for housing the enlarged end of a tube, said coupling members defining therebetween an annular chamber, a packing member disposed within said annular chamber and surrounding said tube in the region of the enlarged end, and a sleeve surrounding said packing member and having an inwardly extending flange at one end in contact with the tube adjacent the enlarged end thereof and abutting against one of the coupling members, the other end of said sleeve abutting against the other coupling member upon relative movement of said coupling members toward one another to tightly press the packing against the tube adjacent the enlarged end whereby said tube is resiliently supported in said coupling and positively restrained from withdrawal therefrom.

JOHN N. WOLFRAM.

REFERENCES CITED

The following references are of record in the file of this patent:

UNITED STATES PATENTS

| Number | Name | Date |
|---|---|---|
| 616,808 | Ricketts | Dec. 27, 1898 |
| 2,316,806 | Parker | Apr. 20, 1943 |

FOREIGN PATENTS

| Number | Country | Date |
|---|---|---|
| 137,594 | Austria | May 11, 1934 |
| 513,555 | Great Britain | Oct. 16, 1939 |